(12) United States Patent
Yim et al.

(10) Patent No.: US 7,197,757 B2
(45) Date of Patent: Mar. 27, 2007

(54) DISK CARTRIDGE

(75) Inventors: Hong-kyun Yim, Gyeonggi-do (KR);
Yong-hoon Lee, Gyeonggi-do (KR);
Jae-yong Eum, Gyeonggi-do (KR);
Han-kook Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 749 days.

(21) Appl. No.: 10/339,412

(22) Filed: Jan. 10, 2003

(65) Prior Publication Data
US 2003/0128655 A1 Jul. 10, 2003

(30) Foreign Application Priority Data
Jan. 10, 2002 (KR) .................................. 2002-1430

(51) Int. Cl.
*G11B 23/03* (2006.01)
(52) U.S. Cl. ...................................... 720/741
(58) Field of Classification Search ..................... None
See application file for complete search history.

(56) References Cited

U.S. PATENT DOCUMENTS

| 4,692,831 A | 9/1987 | Suzuki |
| 4,814,926 A | 3/1989 | Gulbrandsen |
| 5,278,717 A | 1/1994 | Sasaki et al. |

FOREIGN PATENT DOCUMENTS

| JP | 61-6974 | 1/1986 |
| JP | 4-67486 | 3/1992 |
| KR | 1994-5563 | 6/1994 |

OTHER PUBLICATIONS

U.S. Appl. No. 10/367,739, filed Feb. 19, 2003, Yim et al., Samsung Electronics Co., Ltd.
U.S. Appl. No. 10/369,130, filed Feb. 20, 2003, Yim et al., Samsung Electronics Co., Ltd.
Abstract of PCT Application WO 02/56313, published Jul. 18, 2002.

*Primary Examiner*—Hoa Thi Nguyen
*Assistant Examiner*—Mark Blouin
(74) *Attorney, Agent, or Firm*—Stein, McEwen & Bui, LLP

(57) ABSTRACT

A disk cartridge includes a case accommodating a disk and having a first hole, a cover installed at the case and having a second hole open to an outside of the cover, a shutter installed to be capable of moving with respect to the case disposed under the disk to open/shut the first hole formed on the case, and a plurality of protruding portions provided at the shutter to support a non information area provided at an outer circumferential side of the disk and having inclined surfaces inclined at a predetermined angle. When the shutter is opened, the disk descends along the inclined surfaces. When the shutter is shut, the disk ascends along the inclined surfaces to closely contact a portion of the cover disposed around the second hole of the cover. Thus, since the shutter contacts only a non-information area of the disk, an information area of the disk can be safely kept from being damaged during an operation of opening/shutting the first hole. Also, since an edge portion of the outer circumferential side of the disk closely contacts a sealing member disposed around the second hole of the cover in a state that the shutter is shut, a gap through which dust can intrude is blocked, so that contamination of the recording surface can be reduced.

59 Claims, 11 Drawing Sheets

DISK CARTRIDGE

CROSS-REFERENCE TO RELATED APPLICATIONS

This application claims the benefit of Korean Patent Application No. 2002-1430, filed Jan. 10, 2002, in the Korean Intellectual Property Office, the disclosure of which is incorporated herein by reference.

BACKGROUND OF THE INVENTION

1. Field of the Invention

The present invention relates to a disk cartridge accommodating an information recording/reproduction medium (a disk) so that a recording surface of the disk can be protected from contaminants, such as dust or fingerprints, and more particularly, to a disk cartridge in which a disk ascends and descends along protrusion portions formed on a shutter to protect a recording surface of the disk when the shutter is opened and shut.

2. Description of the Related Art

In general, a disk cartridge accommodating a disk, that is, an information recording/reproducing medium, is loaded in a disk drive apparatus. As shown in FIG. 1, a conventional disk cartridge includes a case 101 accommodating a disk D, a shutter 110 installed in the case 101 to be capable of rotating to selectively open/shut a first hole 102 formed on the case 101, so that a pickup (not shown) of the disk drive apparatus can access the disk D, and a cover 103 coupled to an upper portion of the case 101. The disk cartridge includes a second hole 103b formed in the cover 103 to change the disk D, and an escape prevention lever 103a installed on the cover 103 to be capable of sliding so that the disk D does not escape through the second hole 103b. Thus, when the disk D is installed in the disk cartridge, the escape prevention lever 103a is moved back so as not to interfere with the disk D. When the installation of the disk D is completed, the escape prevention lever 103a is moved forward as shown in FIG. 1, so that the disk D is prevented by a leading end portion of the escape prevention lever 103a from escaping through the second hole 103b.

When the disk cartridge 100 containing the disk D is inserted in the disk drive apparatus as shown in FIG. 2A, an opening lever 120 installed at the disk drive apparatus pushes a locking piece 111a to release a locking state between a protrusion 111c of the shutter 110 and a groove 101a of the case 101. Next, as shown in FIG. 2B, the opening lever 120 pushes and rotates an interference piece 111b. The shutter 110 includes a center hole 114 and first and second shutter portions 111 and 112 which are respectively installed on the case 101 to be capable of rotating around left and right rotation shafts 110a and engaged with each other via an engagement threaded portion 113. When the first shutter portion 111 integrally connected to the interference piece 111b rotates clockwise, the second shutter portion 112 rotates counterclockwise. Accordingly, the first and second shutter portions 111 and 112 are separated from each other to open the first hole 102. Thus, the pickup of the disk drive apparatus can access a recording surface of the disk D through the first hole 102 that is opened, so that information recording and/or reproducing can be performed. Although not shown in FIG. 3, a torsion spring elastically biasing the first shutter portion 111 counterclockwise, that is, in a direction in which the first hole 102 is shut, is installed on the right rotation shaft 110a between the first shutter portion 111 and a bottom surface of the case 101. Thus, when a force applied to the opening lever 120 is removed, the shutter 110 is returned to an original shut state.

However, in the above structure, since the shutter 110 is installed on the case 101, and the disk D is placed on the shutter 110, during an opening/shutting operation of the shutter 110, a surface contact between the recording surface of the disk (the lower surface of the disk in the drawing) and the shutter 110 occurs, so that the recording surface of the disk may be damaged.

Also, dust can enter through the second hole 103b of the cover 103. Of course, since the upper surface of the disk D facing the second hole 103b is not a recording surface, direct contamination by the dust does not occur. However, when the dust is introduced to the disk D through a gap between the disk D and the cover 103 and remains on the shutter 110, the dust on the shutter 110 can adhere to the recording surface of the disk indirectly during the opening/shutting operation.

Therefore, there is a need to protect the recording surface of the disk during the opening/shutting operation of the shutter 110.

SUMMARY OF THE INVENTION

To solve the above and/or other problems, the present invention provides a disk cartridge which can protect a recording surface of a disk from being damaged by a contamination source during an opening/shutting operation of a shutter installed in a case.

Additional aspects and advantages of the invention will be set forth in part in the description which follows and, in part, will be obvious from the description, or may be learned by practice of the invention.

According to an aspect of the present invention, a disk cartridge including a case accommodating a disk and having a first hole, a cover installed on the case and having a second hole open to an outside of the cover, and a shutter installed to be capable of moving with respect to the case disposed under the disk to open/shut the first hole formed on the case. The disk cartridge further includes a plurality of protruding portions provided at the shutter to support a non information area provided at an outer circumferential side of the disk and having inclined surfaces inclined at a predetermined angle toward a center of the disk, so that, when the shutter is opened, the disk descends along the inclined surfaces and, when the shutter is shut, the disk ascends along the inclined surfaces to closely contact a portion of the disk around the first hole of the cover.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
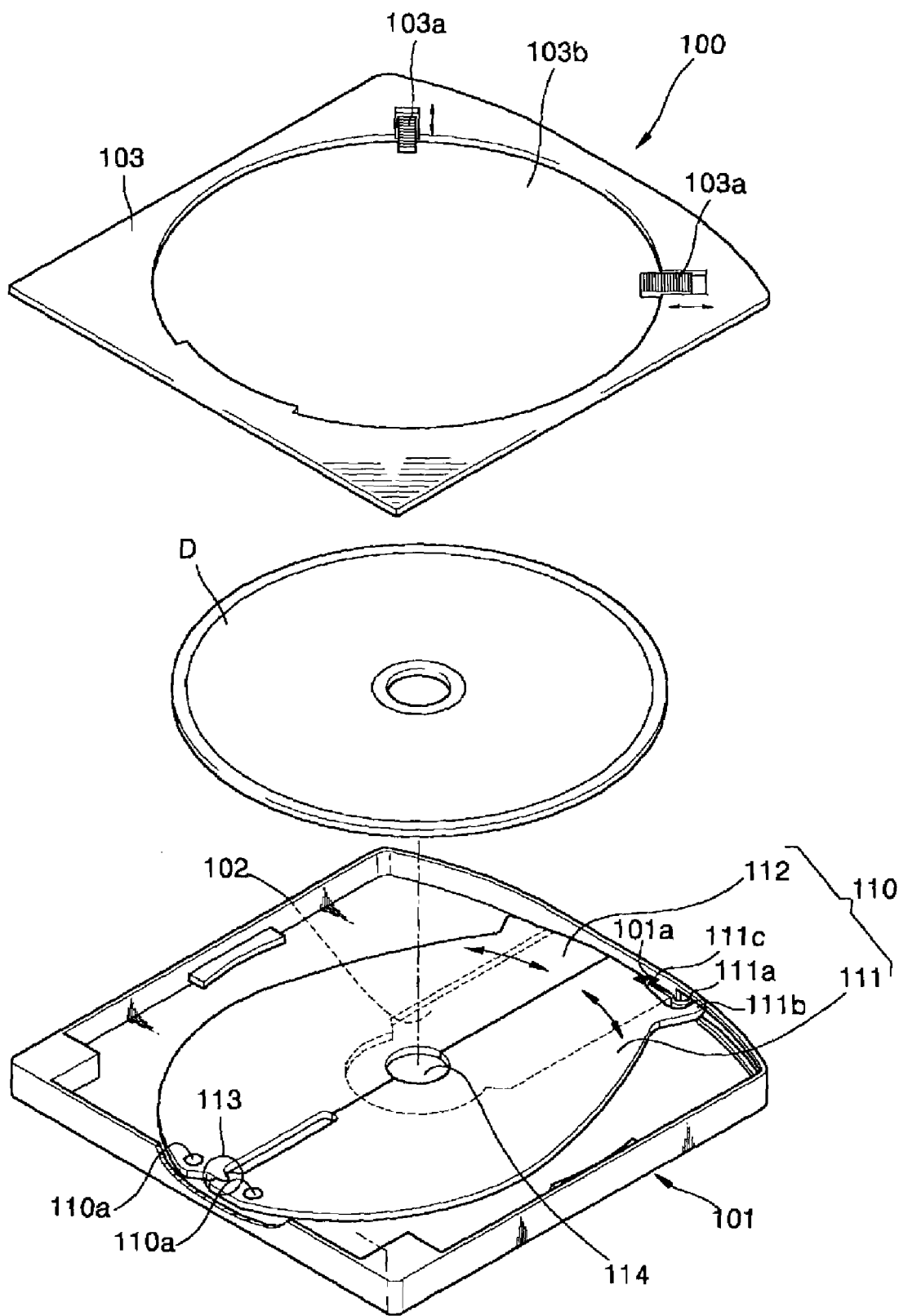
FIG. 1 is a perspective view illustrating a conventional disk cartridge.
Figure 2A:
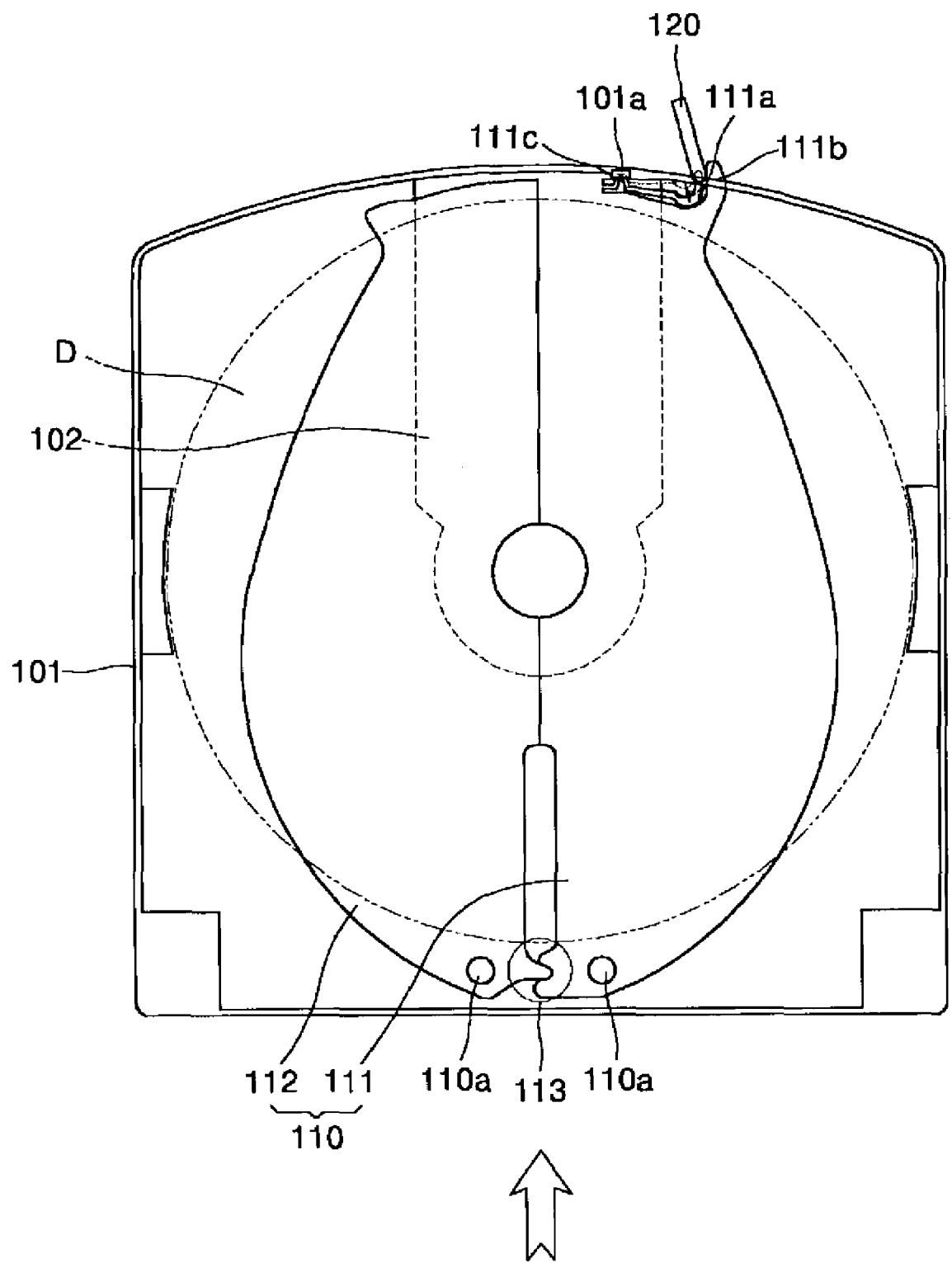
FIGS. 2A and 2B are plan views illustrating a state in which a shutter is opened/shut in the disk cartridge shown in FIG. 1.
Figure 2B:
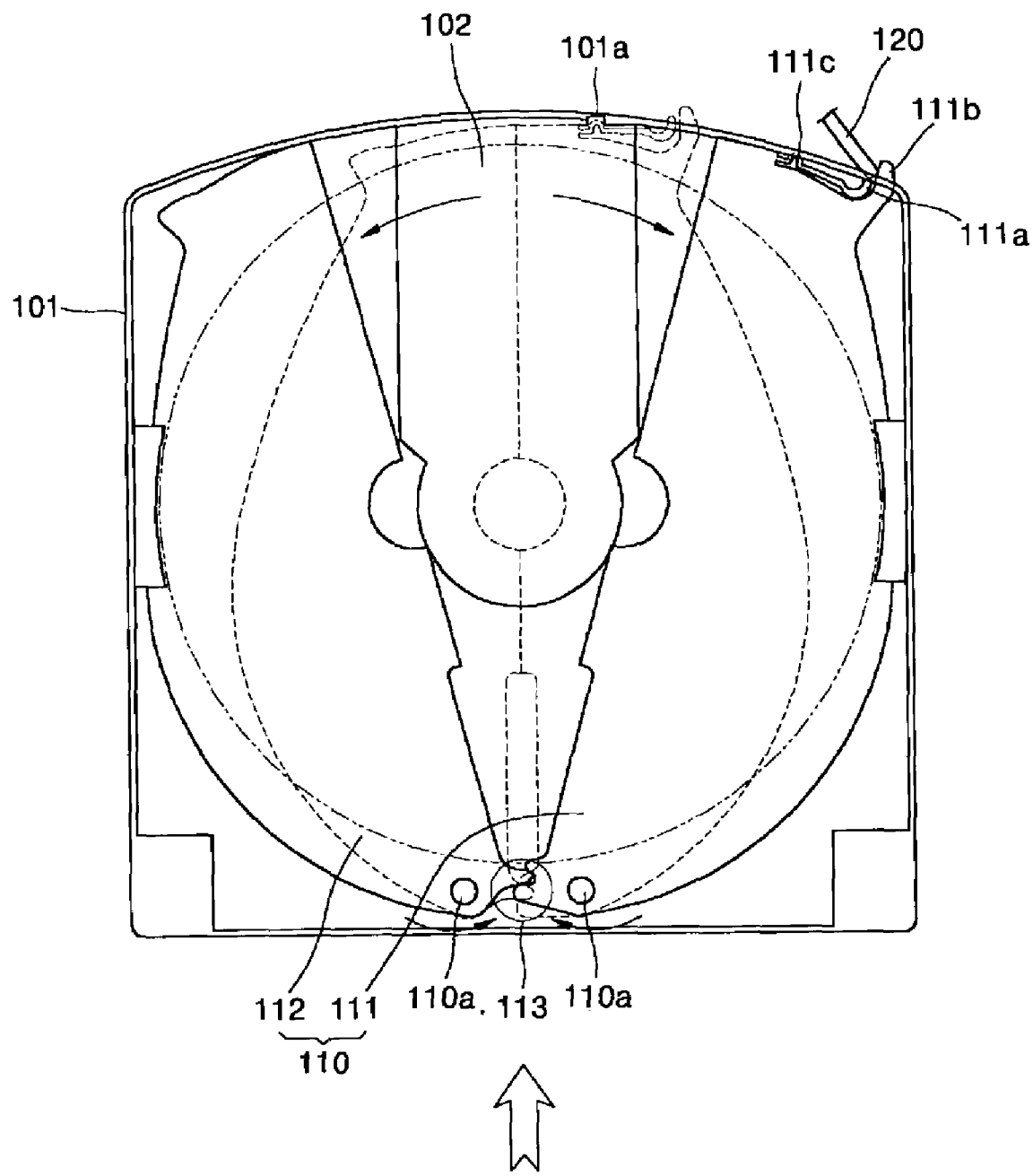

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 3:
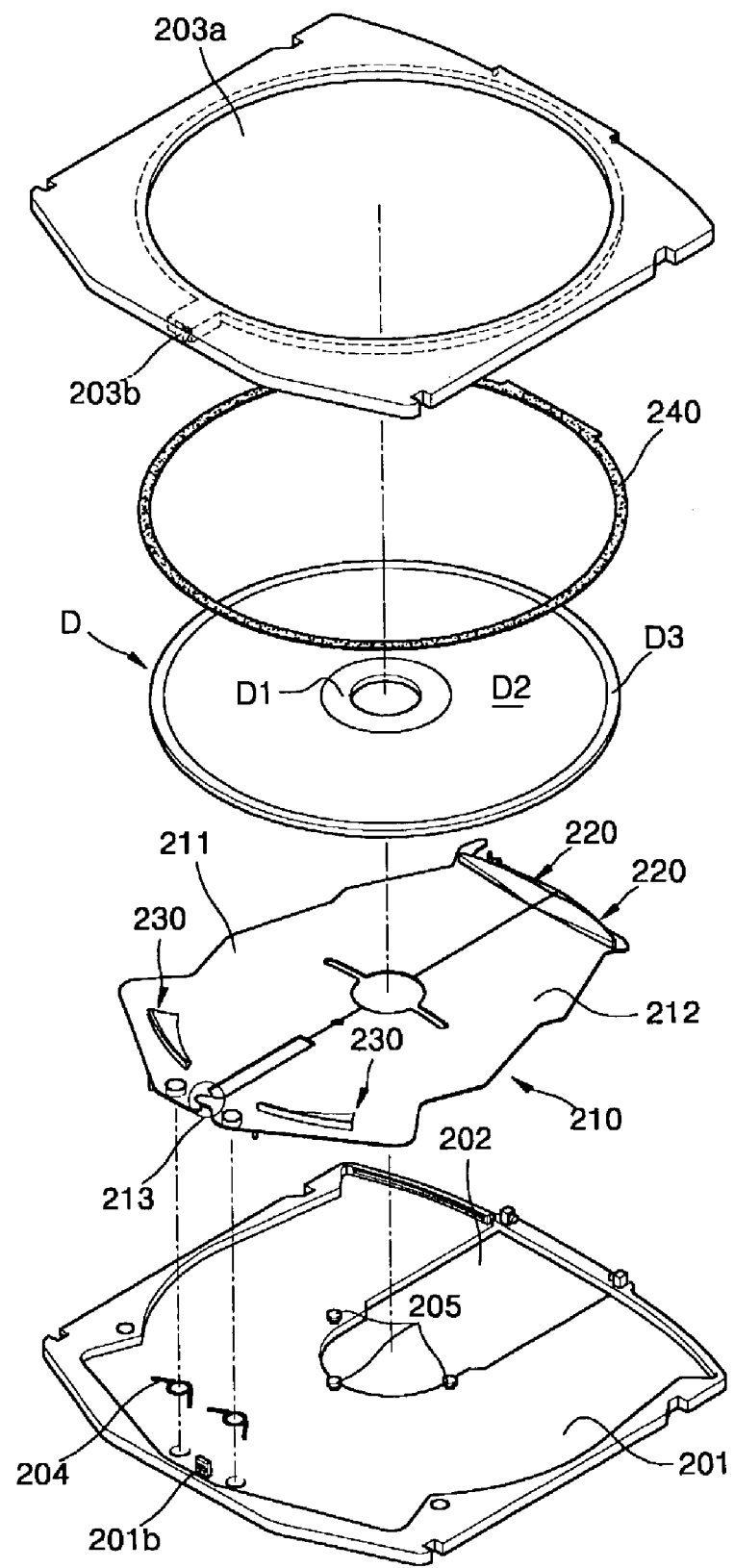
FIG. 3 is an exploded perspective view illustrating a disk cartridge according to an embodiment of the present invention.
Figure 4:
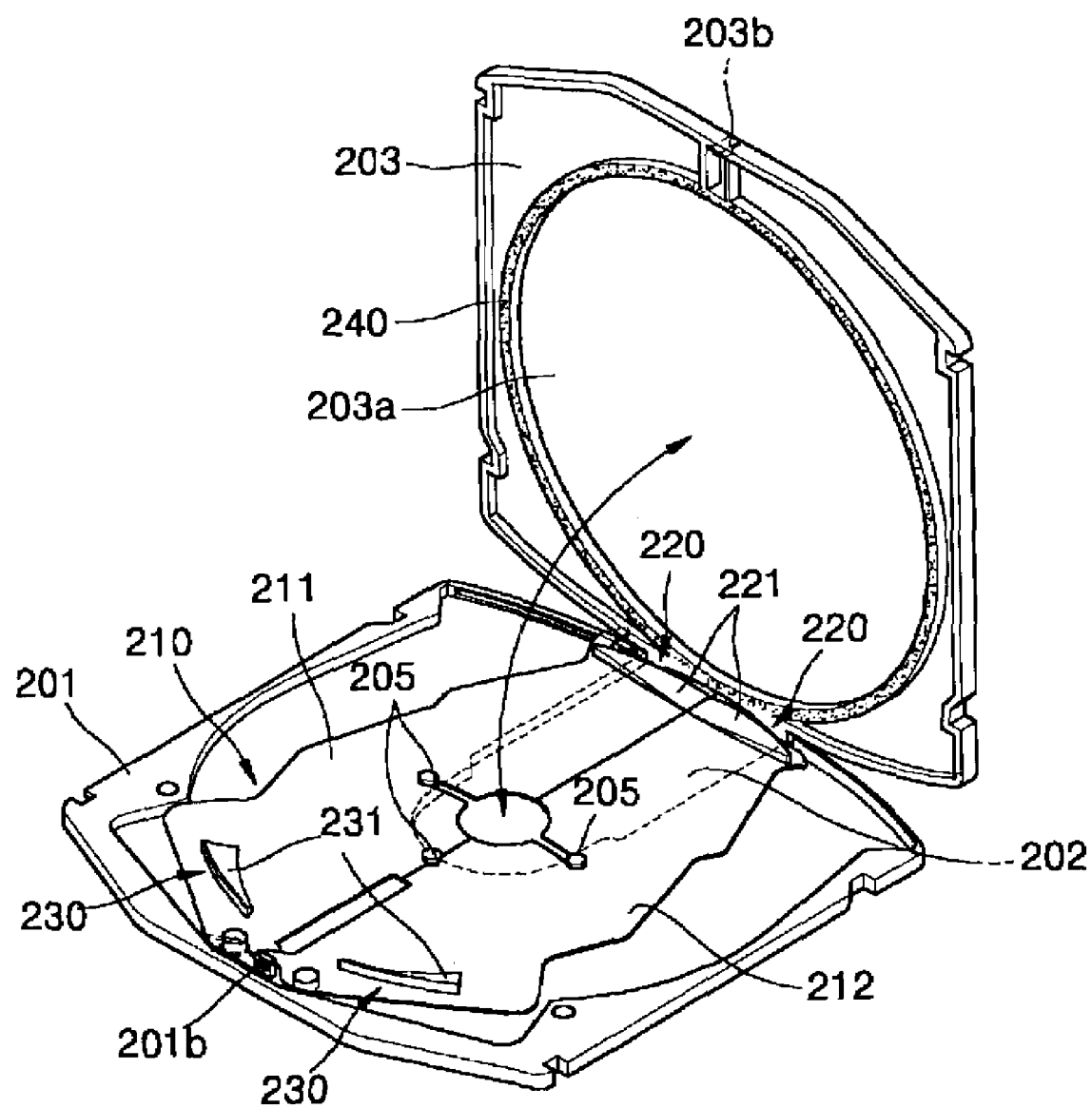
FIG. 4 is a perspective view illustrating an assembled state of the disk cartridge of FIG. 3.

FIGS. 3 and 4 show disassembled and assembled states of a disk cartridge according to an embodiment of the present invention.

Referring to the FIGS. 3 and 4, the disk cartridge includes a case 201 accommodating a disk D, a shutter 210 opening/shutting a first hole 202 formed on the case 201 disposed under the disk D, and a cover 203 covering an upper surface of the case 201. The disk cartridge further includes a seal member, such as a non-woven fabric, attached to a rim defining a second hole 203a of the cover 203.

First, the shutter 210 includes first and second shutter portions 211 and 212 installed inside the case 201 to be capable of rotating symmetrically with respect to a center line disposed between the first and second shutter portions 211 and 212. Thus, when the first and second shutter portions 211 and 212 are rotated in first opposite directions in which they are separated from each other, the first hole 202 is opened (refer to FIG. 7). In contrast, when the first and second shutter portions 211 and 212 are rotated in second opposite directions in which they approach each other, the first hole 202 is shut (refer to FIG. 5). The disk cartridge includes an engagement threaded portion 213 connecting the first and second shutter portions 211 and 212 being engaged with each other. Accordingly, when the first shutter portion 211 is rotated, the second shutter portion 212 is rotated in a direction symmetrically opposite to that of a rotation of the first shutter portion 211. A torsion spring 204 elastically biasing the first and second shutter portions 211 and 212 in the second opposite directions to shut the first hole 202 is installed between each of the first and second shutter portions 211 and 212 and a bottom surface of the case 201. Thus, when a force applied to the first and second shutter portions 211 and 212 by an opening lever 120 is removed, the shutter 210 is returned to an original shut state.

Protruding portions 220 and 230 contacting an edge portion D3 of an outer circumferential side of the disk D are formed at the first and second shutter portions 211 and 212. That is, the disk D is divided into a clamping area D1 provided at an inner circumferential side of the disk D, an information area D2 where information is recorded, and the edge portion D3 provided outside the information area D2.

Figure 6:
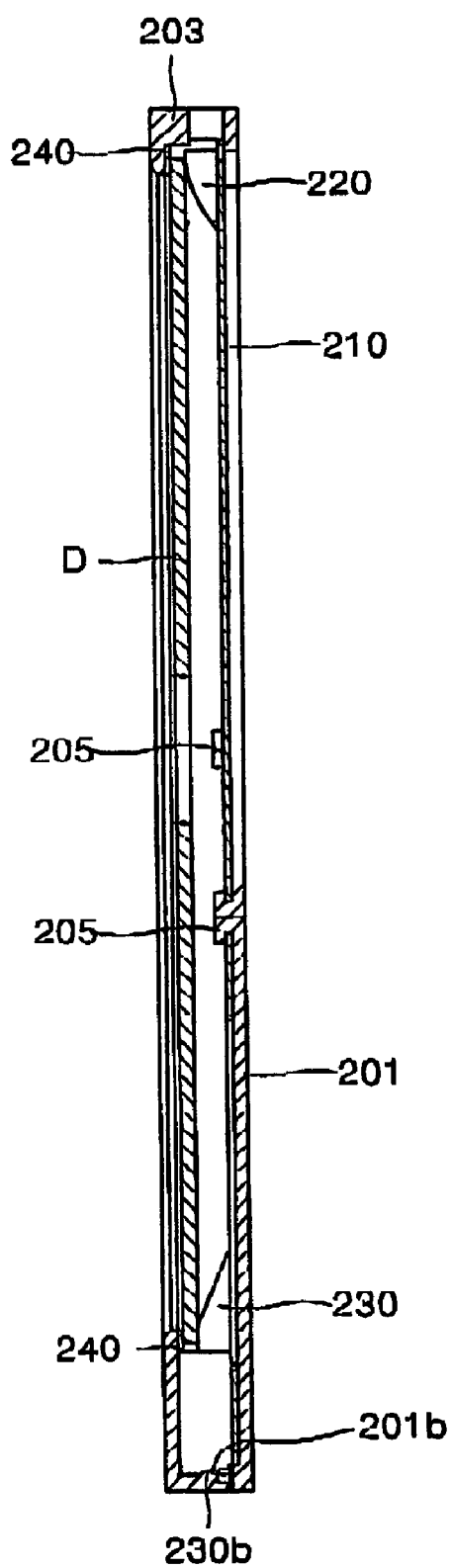
FIG. 6 is a sectional view taken along line VI—VI of FIG. 5.
Figure 8:
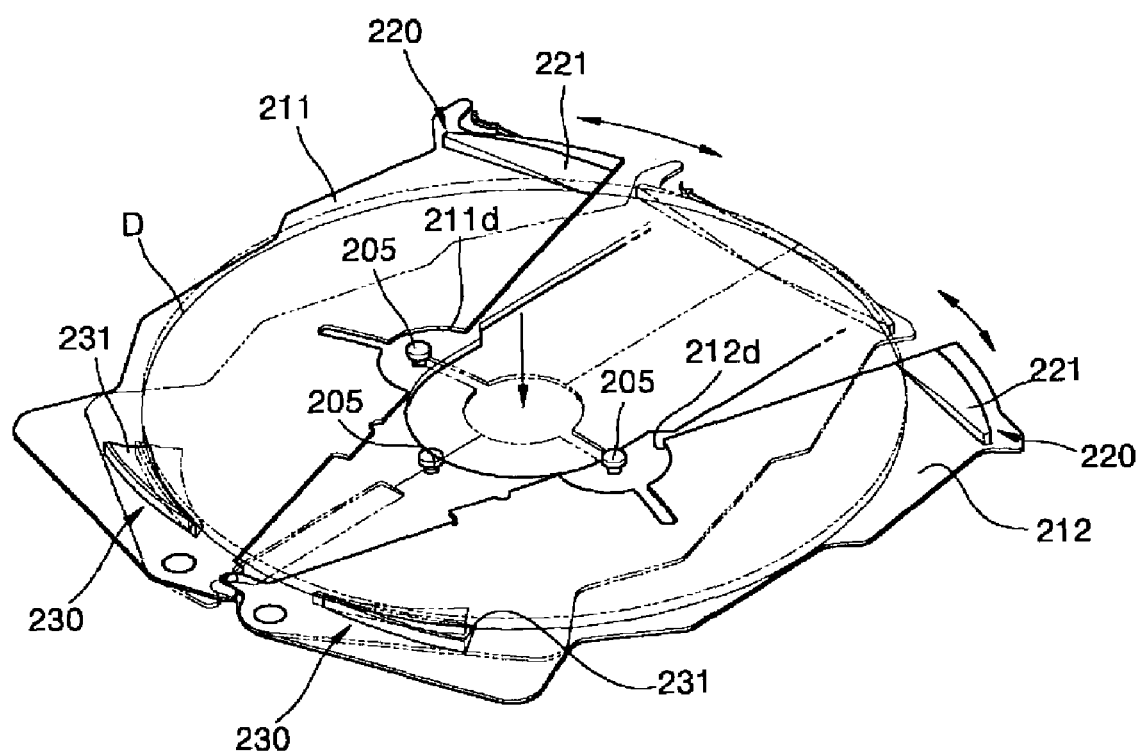
FIG. 8 is a view showing a state in which the disk moves up and down along protrusion portions formed on the shutter during an opening/shutting operation of the disk cartridge shown in FIG. 3.

Since the protruding portions 220 and 230 support the edge portion D3 that is one of non-information areas, a contact between the information area D2 and the shutter 210 can be avoided. The protruding portions 220 and 230 include inclined surfaces 221 and 231 inclined toward a center of the disk D and with respect to a major surface of the shutter 210, respectively, as shown in FIG. 8. Thus, when the first and second shutter portions 211 and 212 are shut as indicated by a dotted line in FIG. 8, the edge portion D3 of the disk D is supported by upper ends of the protruding portions 220 and 230. When the shutter 211 and 212 are opened as indicated by a solid line of FIG. 8, the disk D descends along the inclined surfaces 221 and 231. The clamping area D1 at the inner circumferential side of the disk D that is lowered is supported by a plurality of guide protrusions 205 formed on the case 201. In contrast, the edge portion D3 of the disk D that is raised closely contacts the seal member 240 that is the non-woven fabric as shown in FIG. 6. Thus, a gap between the cover 203 and the edge portion D3 of the disk D is blocked so that dust can be prevented from being introduced into the disk cartridge through the gap. Instead of the non-woven fabric as the seal member 240, soft materials, such as rubber, which can be elastically deformed when receiving a closely pushing force by the disk D, can be adopted.

Since the second hole 203a of the cover 203 is formed to have a diameter smaller than that of the disk D, the disk D is prevented from escaping through the second hole 203a. When the disk D is to be replaced, the cover 203 pivots to be opened as shown in FIG. 4. Then, the disk D is taken out from the case 201, and a new disk is inserted therein. The disk cartridge includes a locking protrusion 203b and a coupling hole 201b provided at the cover 203 and the case 201, respectively, and elastically coupled to each other when the cover 203 is shut.

Figure 5:
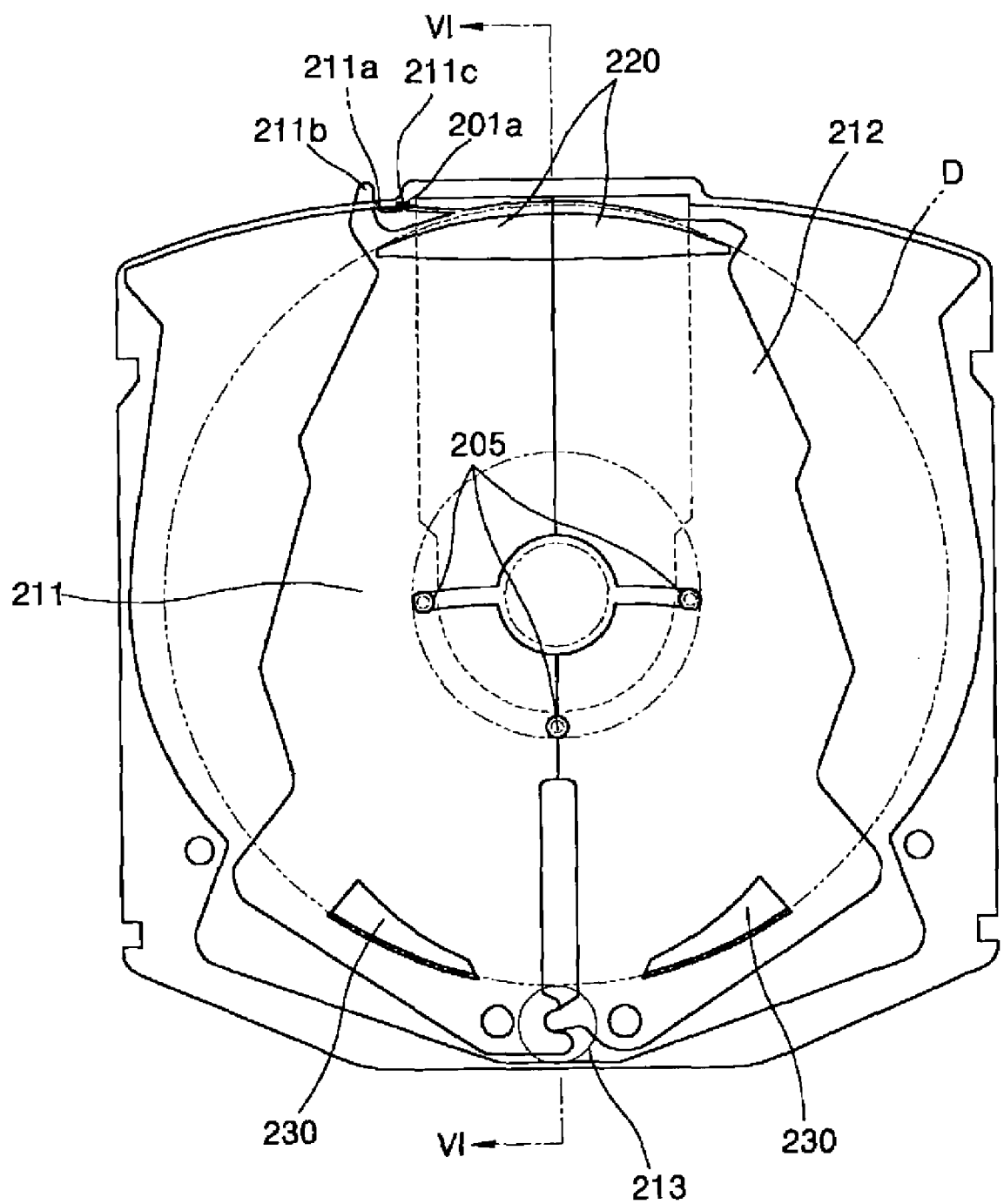
FIG. 5 is a plan view showing the state in which a shutter is shut in the disk cartridge shown in FIG. 3.
Figure 7:
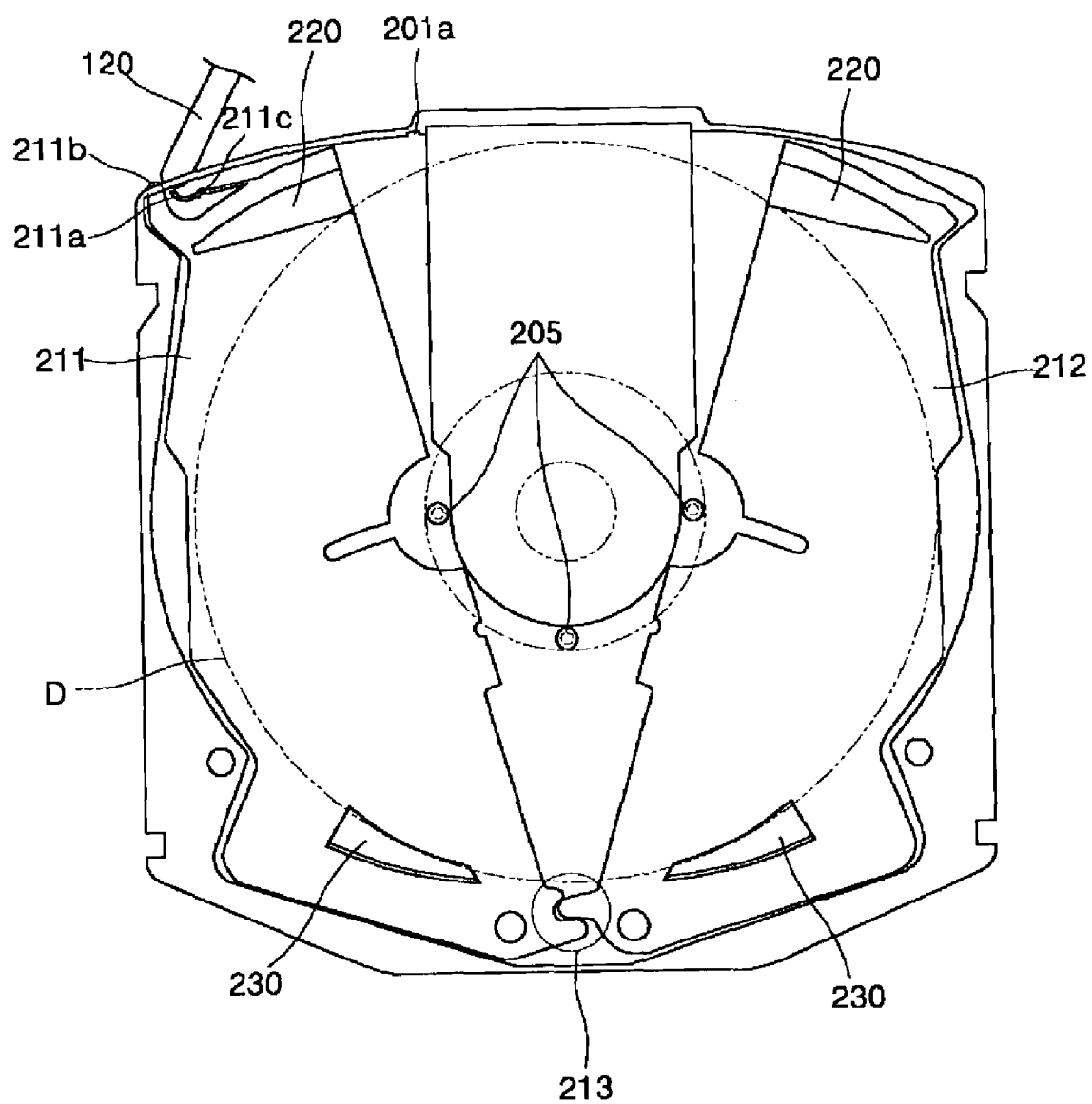
FIG. 7 is a plan view illustrating the state in which the shutter of the disk cartridge shown in FIG. 3 is opened.

The disk cartridge containing the disk D is inserted into the disk drive apparatus in a state that the shutter 210 and the cover 203 are shut as shown in FIGS. 5 and 6. When the disk cartridge enters the disk drive apparatus as shown in FIG. 7, the opening lever 120 installed at the disk drive apparatus pushes the locking piece 211a to unlock a locking protrusion 211c and a groove 201a and then pushes an interference piece 211b to rotate the first shutter portion 211 counter-clockwise on FIG. 1. Then, the second shutter portion 212 is rotated clockwise by the engagement threaded portion 213. Accordingly, the first hole 202 is opened between the first and second shutter portions 211 and 212. Here, since the disk D contacts only the protruding portions 220 and 230 of the first and second shutter portions 211 and 212, and a contact portion of the disk D is limited only to the edge portion D3 of the disk D, the information area D2 of the recording surface during an opening/shutting operation of the shutter 210 is hardly damaged. As the shutter 210 is opened, the disk D descends along the inclined surfaces 221 and 231 of the protruding portions 220 and 230 so as to be supported on the guide protrusions 205. In this state, a turntable (not shown) of the disk drive apparatus driving the disk D of the disk cartridge enters through the first hole 202 that is opened, and a damper (not shown) of the disk drive apparatus enters through the second hole 203a of the cover 203 to clamp the disk D supported by the protrusions 205. Then, when the turntable rotates, recording and reproducing is performed on the disk D.

When the recording and/or reproducing are completed, and the clamping of the disk D by the turntable and the damper is released, the disk D remains such that the clamping area D1 is supported on the protrusions 205. In this state, when the disk cartridge escapes from the disk drive apparatus, the first and second shutter portions 211 and 212 pivot to their original positions so that the first hole 202 is shut. Here, the edge portion D3 of the disk D ascends along the inclined surfaces of the protruding portions 220 and 230 to be in the state shown in FIGS. 5 and 6. Here, since the shutting operation is performed without contact between the shutter 210 and the information area D2, the information area D2 can be safely kept. Also, in this state, since the edge portion D3 of the disk D closely contacts the circumferential portion of the second hole 203a of the cover 203 via the seal member 240 interposed therebetween, the contaminants, such as the dust, is prevented from being introduced into the disk cartridge through the gap.

Figure 9:
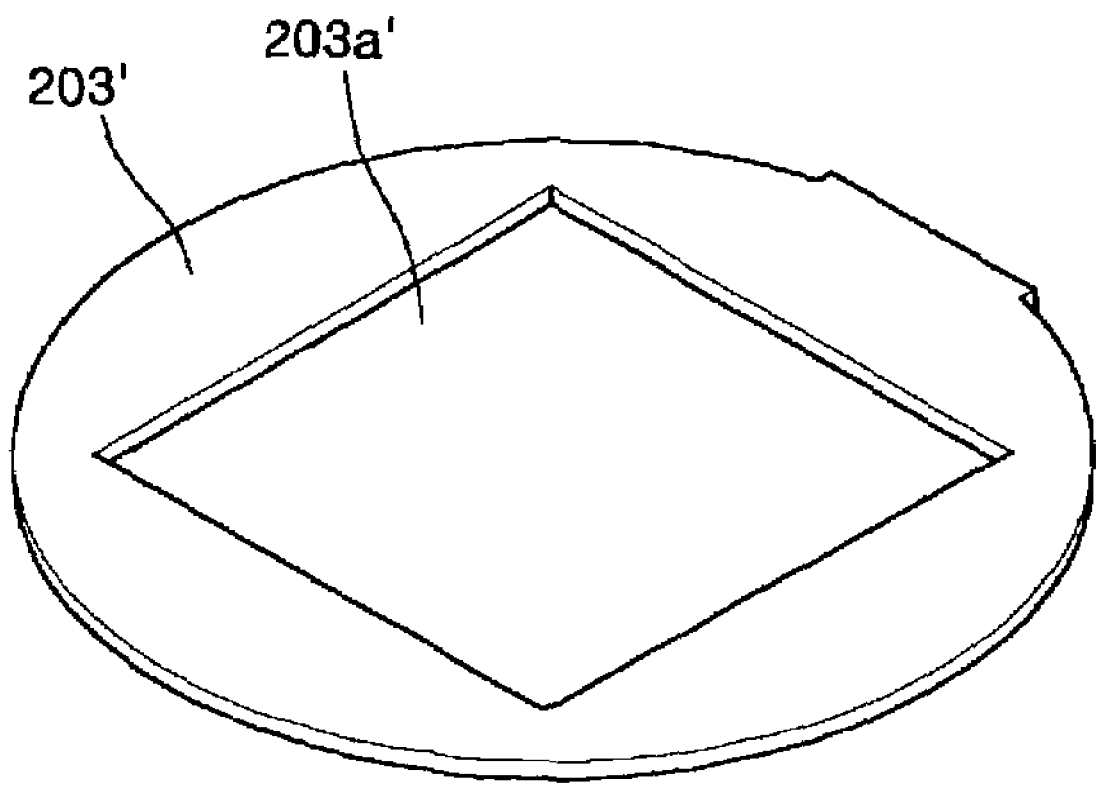
FIG. 9 is a view illustrating another cover of the disk cartridge shown in FIG. 3 according to another embodiment of the present invention.

In the present embodiment, since the second hole 203a is formed to have a diameter smaller then that of the disk D, the disk D can be prevented from escaping through the second hole 203a without installing the escape prevention lever 103a (refer to FIG. 1) in the conventional technology. However, any open hole having a variety of shapes capable of preventing escape of the disk D can be adopted. For example, as shown in FIG. 9, a rectangular second hole 203a' having an area smaller than that of the disk D is formed at a center of a cover 203', so that the disk D is prevented from escaping through the second hole 203a'. However, an open area through which the damper enters should be secured for clamping of the disk.

Figure 10:
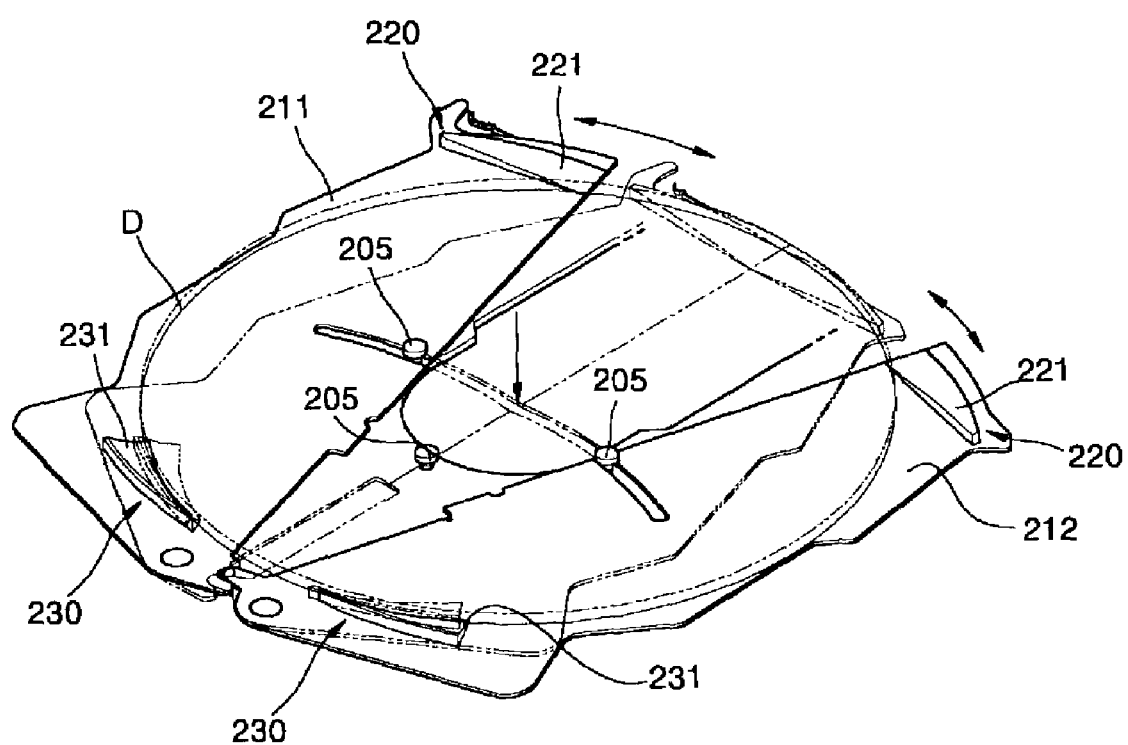
FIG. 10 is a view illustrating another shutter of the disk cartridge shown in FIG. 3 according to another embodiment of the present invention.

Also, in the above preferred embodiment, semicircular cut portions 211d and 212d are formed on the first and second shutter portions 211 and 212, respectively, to form a hole corresponding to a center of the disk D when the first and second shutter portions 211 and 212 are shut (refer to FIG. 8). When the cover 203 is opened, and the disk D is to be taken out from the disk cartridge, the hole formed on the shutter 210 facilitates the taking out of the disk from the disk cartridge by allowing a user to insert a finger into the hole of the disk D. That is, when the hole is formed on the shutter 210, since the user can insert the finger into the center hole of the disk D deep enough to bend the finger to hold the disk D, the disk D can be conveniently taken out from the disk cartridge. Otherwise a structure shown in FIG. 10 is possible to reduce an amount of the dust adhering to the recording surface of the disk D from a lower side of the shutter 210. In FIG. 10, a slot is formed on the first and second shutter portions 211 and 212 in a circular direction with respect to a rotation center of the shutter 210 to correspond to the guide protrusion 205 interfering with a portion of the disk D during the opening/shutting operation while blocking other portions of the disk D. In addition, when the shutter 210 is shut and open, the guide protrusion 205 is inserted into and released from the slot and may guide the first and second shutter portions 211 and 212 to be stably open and shut. Thus, to prevent even a smallest possibility that the dust adheres to the recording surface of the disk D, the semicircular cut portions 211d and 212d may not be formed on the shutter 210 as shown in FIG. 10.

As described above, the disk cartridge of the present invention has the following advantages.

First, since the shutter in the case contacts only the non-information area of the disk, the disk information area can be safely kept during the operation of opening/shutting the opening hole.

Second, since the edge portion of the outer circumferential side of the disk closely contacts the sealing member around the second hole of the cover in a state that the shutter is shut, a gap through which dust can intrude is blocked so that contamination of the recording surface can be reduced.

Third, since the cover is installed at the case to be open/shut by pivoting to facilitate replacement of the disk and an area of the second hole is formed to be smaller than that of the disk, the disk can be safely kept without installing an additional escape prevention member.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A disk cartridge including a case accommodating a disk and having a first hole, a cover installed at the case and having a second hole open to an outside of the cover, and a shutter movably installed on the case and disposed under the disk to open/shut the first hole formed in the case, the disk cartridge comprising:

a plurality of protruding portions provided on the shutter to support a non-information area provided at an outer circumferential side of the disk and having inclined surfaces inclined at a predetermined angle, so that, when the shutter is opened, the disk descends along the inclined surfaces of the protruding portions and, when the shutter is shut, the disk ascends along the inclined surfaces of the protruding portions to closely contact a portion of the cover disposed around the second hole of the cover.

2. The disk cartridge as claimed in claim 1, wherein the cover comprises:

a sealing member installed on the portion disposed around the second hole to closely contact the disk.

3. The disk cartridge as claimed in claim 2, wherein the sealing member comprises:

a material which is elastically deformed according to contact force of the disk.

4. The disk cartridge as claimed in claim 3, wherein the sealing member is formed of one of non-woven fabric and rubber.

5. The disk cartridge as claimed in claim 1, wherein the cover is pivotably installed at the case to open and shut the case.

6. The disk cartridge as claimed in claim 5, wherein the second hole has an area smaller than that of the disk.

7. The disk cartridge as claimed in claim 5, further comprising:

a locking protrusion formed at one of the cover and the case; and a coupling groove elastically coupled to the locking protrusion and formed at the other one of the cover and the case.

8. The disk cartridge as claimed in claim 1, wherein the case comprises:

a protrusion supporting a non-information area at an inner circumferential side of the disk when the disk descends along the inclined surfaces of the protruding portions.

9. A disk cartridge including a case having a first hole, a cover installed at the case, and a shutter movably installed between the case and the cover to open/shut the first hole of the case, the disk cartridge comprising:

a plurality of protruding portions provided on the shutter and each having an inclined surface inclined toward a disk and with respect to a major surface of the shutter, so as to enable the disk to move along inclined surfaces of the protruding portions when the shutter opens/shuts the first hole of the case.

10. The disk cartridge as claimed in claim 9, wherein the protruding portions are disposed in a circular direction of the shutter.

11. The disk cartridge as claimed in claim 9, wherein the protruding portions are disposed on an outer circumferential side of the shutter.

12. The disk cartridge as claimed in claim 9, wherein the protruding portions are disposed to be opposite to each other with respect to a center line of the shutter.

13. The disk cartridge as claimed in claim 9, wherein the protruding portions are spaced apart from each other when the shutter opens the first hole of the case.

14. The disk cartridge as claimed in claim 9, wherein the protruding portions protrude from the major surface of the shutter toward the cover.

15. The disk cartridge as claimed in claim 9, wherein the inclined surface of a respective protruding portion comprises:
 a first end having a first height from the major surface of the shutter; and
 a second end having a second height lower than the first height.

16. The disk cartridge as claimed in claim 15, wherein the first end has a first radius from a center of the shutter, and the second end has a second radius smaller than the first radius.

17. The disk cartridge as claimed in claim 15, wherein each of the first end and the second end is formed in a circular direction of a center of the disk cartridge.

18. The disk cartridge as claimed in claim 15, wherein the first end and the second end are disposed in a radial direction of a center of the disk cartridge.

19. The disk cartridge as claimed in claim 9, wherein the disk cartridge accommodates a disk having an information area and a non-information area between the cover and the shutter, and the protruding portions are disposed to correspond to the non-information area of the disk.

20. The disk cartridge as claimed in claim 19, wherein disk moves along the inclined surface of each protruding portion when the shutter is shut and open.

21. The disk cartridge as claimed in claim 20, wherein the case comprises a plurality of guide protrusions disposed to correspond to the non-information area of the disk.

22. The disk cartridge as claimed in claim 21, wherein the guide protrusions protrude toward the shutter, and the non-information area of the disk contacts the guide protrusions when the shutter opens the first hole of the case.

23. The disk cartridge as claimed in claim 21, wherein the non-information area of the disk does not contact the guide protrusions while contacting the cover when the shutter shuts the first hole of the case.

24. The disk cartridge as claimed in claim 21, wherein the information area of the disk does not contact the protruding portions and the guide protrusions when the disk moves along the inclined surface to contact one of the cover and the guide protrusions.

25. The disk cartridge as claimed in claim 9, wherein the shutter comprises:
 first and second shutter portions disposed to be opposite to each other with respect to a center line of the shutter and having a rotation shaft formed on one of the case and the cover.

26. The disk cartridge as claimed in claim 25, wherein the rotation shaft is disposed to be spaced-apart from a center of the disk cartridge, and the first and second shutter portions rotate about the rotation shaft.

27. The disk cartridge as claimed in claim 25, wherein the protruding portions comprises:
 first and second protruding portions formed on the first and second shutter portions, respectively, and disposed to be opposite to each other with respect to a center line disposed between the first and second shutter portions.

28. The disk cartridge as claimed in claim 27, wherein each of the first and second protruding portions comprises the inclined surface.

29. The disk cartridge as claimed in claim 27, wherein:
 the first protruding portion comprises,
  sub-first protruding portions formed in a circular direction of a center of the disk cartridge; and
 the second protruding portion comprises,
  sub-second protruding portions formed in the circular direction of the center of the disk cartridge.

30. The disk cartridge as claimed in claim 29, wherein the inclined surface is formed on each of the sub-first protruding portions and the sub-second protruding portions.

31. The disk cartridge as claimed in claim 29, wherein each of the first and second protruding portions comprises:
 a rotation shaft disposed to be spaced-apart from a center of the disk cartridge.

32. The disk cartridge as claimed in claim 31, wherein the sub-first protruding portions and the sub-second protruding portions are disposed around the center of the disk cartridge in a circular direction.

33. The disk cartridge as claimed in claim 31, wherein one of the sub-first protruding portions is disposed to be closer to the rotation shaft than the other one of the sub-first protruding portions.

34. The disk cartridge as claimed in claim 33, wherein one of the sub-second protruding portions is disposed to be closer to the rotation shaft than the other one of the sub-second protruding portions.

35. The disk cartridge as claimed in claim 34, wherein the ones of the sub-first protruding portions and the sub-second protruding portions are disposed to be spaced-apart from each other with respect to the center line of the shutter by a distance.

36. The disk cartridge as claimed in claim 35, wherein the other ones of the sub-first protruding portions and the sub-second protruding portions are disposed to be spaced-apart from each other with respect to the center line of the shutter by a second distance less than the distance.

37. The disk cartridge as claimed in claim 34, wherein the other ones of the sub-first protruding portions and the sub-second protruding portions move to contact each other and be spaced-apart from each other when the first and second shutter portions rotate about the rotation shaft to shut and open the first hole of the case.

38. The disk cartridge as claimed in claim 31, wherein the case comprises:
 guide protrusions protruding from the case toward the shutter disposed on the case.

39. The disk cartridge as claimed in claim 38, wherein the protruding portions and the guide protrusions protrude in the same direction toward the cover from the shutter and the case, respectively.

40. The disk cartridge as claimed in claim 38, wherein the protruding portions have a first radius from the center of the disk cartridge, and the guide protrusions have a second radius from the center of the cartridge less than the first radius.

41. The disk cartridge as claimed in claim 40, wherein the cover comprises:

a second hole having a third radius less than the first radius of the protruding portions.

42. The disk cartridge as claimed in claim 40, wherein the cover comprises:
a second hole having a third radius greater than the second radius of the guide protrusions.

43. The disk cartridge as claimed in claim 40, wherein the cover comprises:
a second hole having an area less than that defined by outermost surfaces of the protruding portions.

44. The disk cartridge as claimed in claim 43, wherein the cover comprises:
a rim defining the second hole; and
a seal member disposed on the rim toward the shutter.

45. The disk cartridge as claimed in claim 38, wherein the disk cartridge receives a disk having an inner non-information area, an outer non-information area, and an information area disposed between the inner non-information area and the outer non-information area, and the protruding portions are disposed to correspond to the outer non-information area of the disk.

46. The disk cartridge as claimed in claim 45, wherein the guide protrusions are disposed to correspond to the inner non-information area of the disk.

47. The disk cartridge as claimed in claim 45, wherein the disk is disposed between the shutter and the cover, and the cover comprises;
a seal member defining a second hole and disposed toward the shutter to contact the disk when the shutter shuts the first hole of the case.

48. The disk cartridge as claimed in claim 45, wherein the second hole of the cover has an area less than that of the disk.

49. The disk cartridge as claimed in claim 45, wherein the sub-first and second protruding portions comprise inclined surfaces, and the disk moves along the inclined surfaces of the sub-first and second protruding portions when the first and second shutters shut and open the first hole of the case.

50. The disk cartridge as claimed in claim 49, wherein the inner non-information area of the disk contacts the guide protrusions while the disk is spaced-apart from the cover.

51. The disk cartridge as claimed in claim 49, wherein the outer non-information area of the disk contacts the cover while the disk is spaced-apart from the guide protrusions.

52. The disk cartridge as claimed in claim 49, wherein each of the first and second shutter portions comprises:
one of a slot receiving the corresponding guide protrusions and a hole corresponding an area defined by the guide protrusions.

53. A disk cartridge including a case, a first hole formed on the case, and a cover installed at the case, the disk cartridge comprising:
a shutter including first and second shutter portions movably installed between the case and the cover to open/shut the first hole of the case;
a plurality of protruding portions formed at the first and second shutter portions, and each having an inclined surface inclined toward a center of a disk and with respect to a major surface of the shutter; and
a plurality of guide protrusions provided on the case to guide the disk as the disk moves along the inclined surfaces of the protruding portions when the shutter opens/shuts the first hole of the case.

54. The disk cartridge as claimed in claim 53, wherein the disk cartridge accommodates a disk between the shutter and the cover, and the disk moves along the inclined surfaces of the protruding portions to contact one of the cover and the guide protrusions.

55. The disk cartridge as claimed in claim 54, wherein the protruding portions are disposed in a circular direction of a center of the disk and each comprises:
a rotation shaft spaced-apart from the center of the disk.

56. The disk cartridge as claimed in claim 55, wherein the inclined surfaces of the protruding portions are inclined toward the center of the disk.

57. The disk cartridge as claimed in claim 55, wherein the protruding portions move in a circular direction of the rotation shaft, and the disk contacts each inclined surface from a first end of the inclined surface to a second end of the inclined surface.

58. The disk cartridge as claimed in claim 57, wherein the first end has a first height from the major surface, and the second end has a second height less than the first height.

59. The disk cartridge as claimed in claim 54, wherein the cover comprises:
a second hole having an area less than that of the disk.

* * * * *